United States Patent [19]

Herrmann

[11] 4,056,242
[45] Nov. 1, 1977

[54] REEL FOR WINDING UP SAFETY BELTS

[75] Inventor: Güenter Herrmann, Munich, Germany

[73] Assignee: Bayern-Chemie Gesellschaft fur flugchemische Antrieve mit beschrankter, Aschau, Germany

[21] Appl. No.: 609,933

[22] Filed: Sept. 3, 1975

[30] Foreign Application Priority Data

Sept. 6, 1974 Germany ............................ 2442744

[51] Int. Cl.$^2$ ..................... A62B 35/00; B65H 75/48
[52] U.S. Cl. ..................... 242/107.4 R; 242/107.4 A; 244/122 B
[58] Field of Search ................. 242/107.4 R, 107.4 A, 242/107.4 B, 107.3; 280/744–747; 244/122 R, 122 B; 297/388; 180/82 C

[56] References Cited

U.S. PATENT DOCUMENTS

| 3,189,296 | 6/1965 | Wrighton et al. | 242/107.4 B |
| 3,220,668 | 11/1965 | Martin | 242/107.4 A |
| 3,405,953 | 10/1968 | Karlsson | 242/107.4 A |
| 3,430,885 | 3/1969 | Holmberg | 242/107.4 B |
| 3,531,061 | 9/1970 | Davies | 242/107.4 B |
| 3,606,378 | 9/1971 | Prostran | 242/107.4 A |
| 3,881,667 | 5/1975 | Tandetzke | 242/107.4 A |

Primary Examiner—Stanley N. Gilbreath
Assistant Examiner—John M. Jillions
Attorney, Agent, or Firm—Blanchard, Flynn, Thiel, Boutell & Tanis

[57] ABSTRACT

A reel for safety belts. There is provided a safety belt for such use as motor vehicles or aircraft, which will normally have only light tension thereon to permit easy movement of the safetied person on the seat of the vehicle or aircraft but which upon sudden change in speed of the vehicle or aircraft will impose a sufficient strong restraint against unwinding thereof as to effect the desired support of the person to whom the safety belt is applied. The device is particularly adapted for fitting into relatively small spaces and is fully integrated for providing its operation without external connections. Particularly, the device embodying the invention is provided with a belt-carrying winch in which a spring maintains a light windup tension thereon. Acceleration sensitive means initially locks the winch to prevent unreeling of the belt and immediately thereafter releases said lock, winds the belt as needed to remove any slack therefrom and applies a brake against further unreeling of the belt.

11 Claims, 7 Drawing Figures

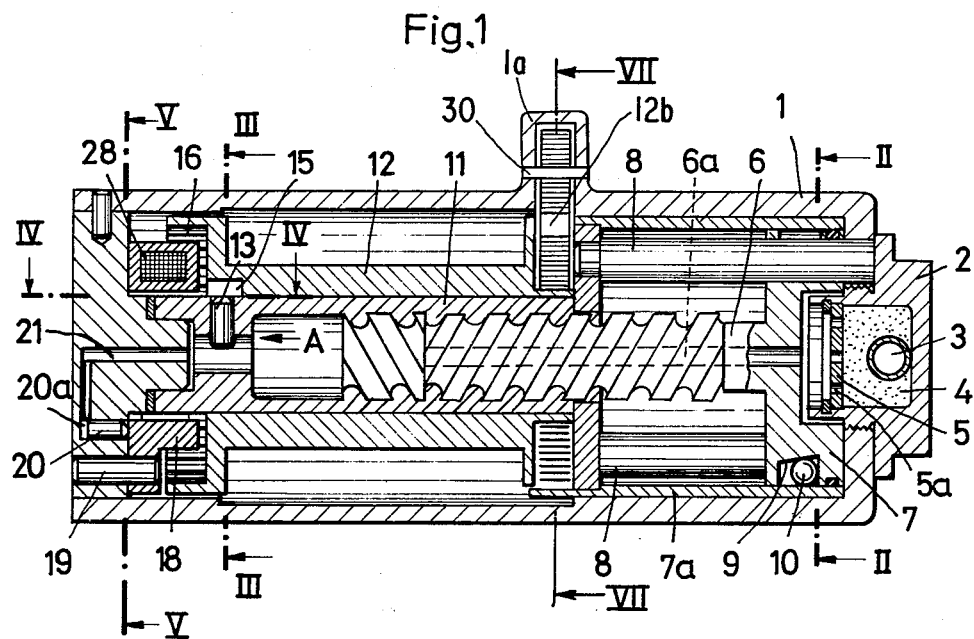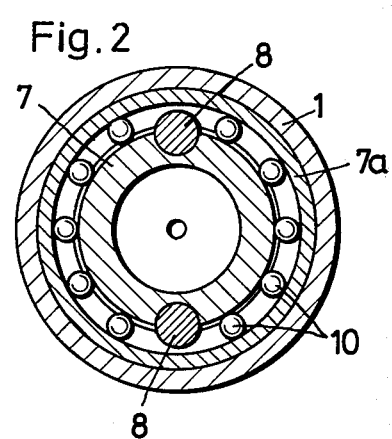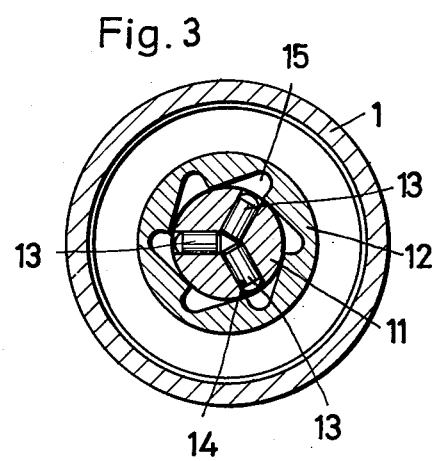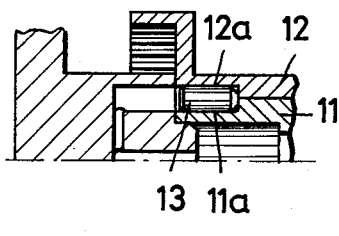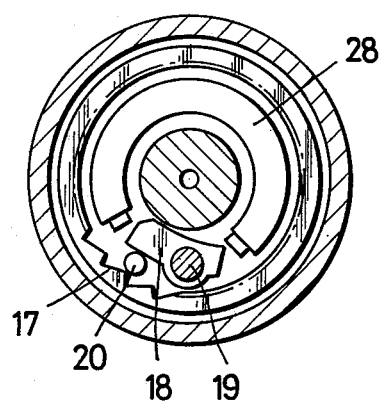

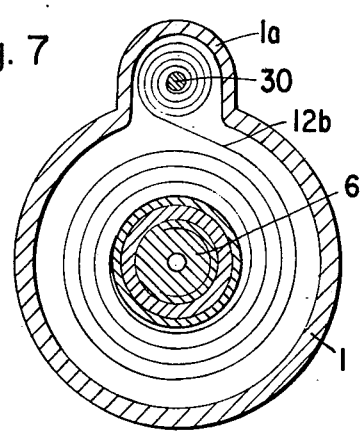
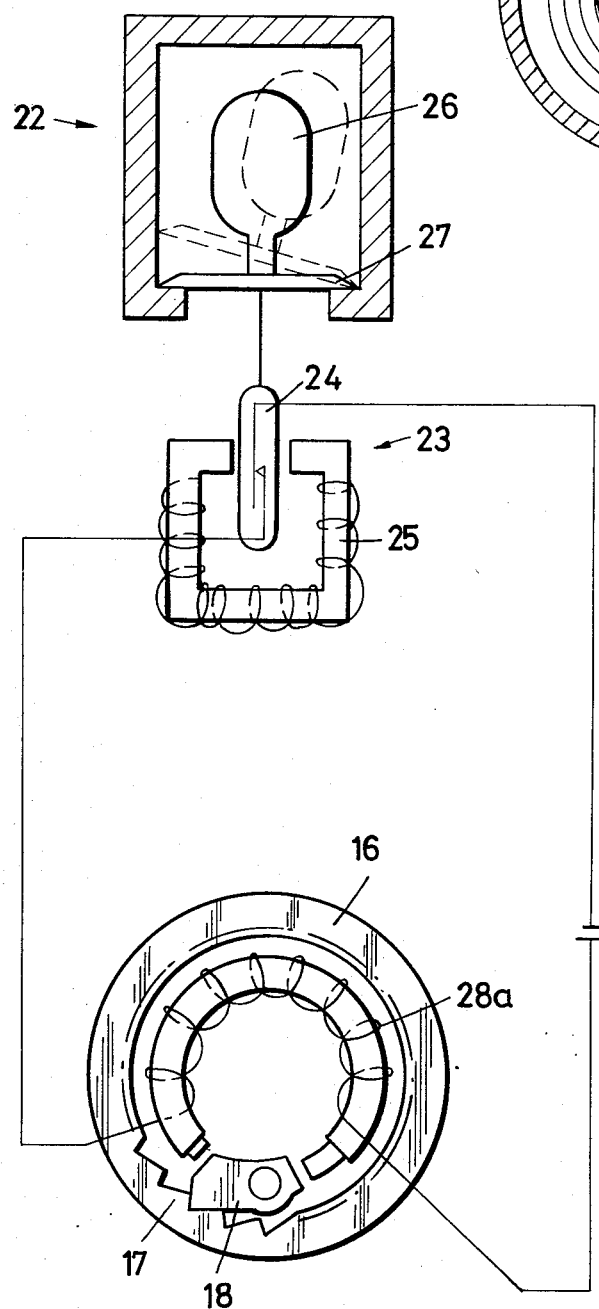

REEL FOR WINDING UP SAFETY BELTS

FIELD OF THE INVENTION

The invention relates to a reel for winding up safety belts in motor vehicles and aircraft comprising an integrated belt tensioning means and integrated pull-out restraining means, same comprising in turn a winch provided with a return spring, an inertia block and a pressure gas operated screw drive high-speed rotating device, which consists of a nut and a spindle having a piston-shaped head and is driven by a pyrotechnically produced gas.

BACKGROUND OF THE INVENTION

A known reel is described in German AS No. 1,292,503 and No. 1,295,390. This reel operates also with a jaw clutch and an inertia block, which acts only onto the belt. The inertia block consists of a ratchet ring, the pawl of which is supported rotatably. The device known from the said German AS requires a separately arranged pyrotechnic charge.

German AS No. 1,406,554 describes a high-speed tensioning device, which has no winch and no inertia block but it does have an integrated load.

A reel, the winch of which operates by means of a double-coil bending moment spring, had been made known by German AS No. 1,933,872 and German AS No. 1,285,896.

An inertia block having an electromagnetic pawl is described in U.S. Pat. No. 2,883,123 and German As No. 1,285,896.

The basic purpose of the present invention is to produce a reel of the above-mentioned type, which avoids the disadvantages of the known devices, and which without additional reconstruction can be used in the location where those types of automatic rollers had been used which do not have a tensioning means and a pull-out restraint.

The fuels which are used in the new reel permit use under temperature conditions ranging from $-40°$ to $+90°$ C. and a warm storage temperature of 105° C.

SUMMARY OF THE INVENTION

According to the invention this purpose is attained by the winch being connectable to the high-speed rotating device through pins which are supported movably in holes, which pins are pressure actuated by means of a pyrotechnically produced gas through an axial hole in the spindle.

The pins can inventively be moved in radial or in axial direction, whereby in the first case pockets are provided in the winch, into which pockets the pins engage, while in the second case in the winch and in the nut grooves are provided which are positioned opposite one another and into which grooves the pins can be impelled.

The new reel device has the advantage that the winch is connected almost slipfree to the high-speed tensioning device, that the belt slack in the entire belt structure is overcome in the short period of time which is available and that the pull-out restraint is achieved substantially with components which are already in existence for the tensioning means.

In order to be able, when using an inertia block consisting of a ratchet ring with a rotatably supported pawl, to cancel the block quickly and safely in the short time available, the invention is further characterized by a pin which is arranged parallel to the axis of the pawl and is axially movable and the one front surface of which pin is connected to a pressurized gas channel, wherein the pin is arranged such that it is impelled out of its guideway by the pyrotechnically produced gas and in this manner releases the connection of the pawl with the ratchet ring.

In order to provide an effective operating temperature range of $-40°$ to $+90°$ C. and the warm storage temperature of 105° C., the invention suggests that for the gas production the following compositions are used separate from one another or individually in powder, granulate or tablet form:

A.
- $84 \pm 2\%$ — Nitrocellulose (N-content 13.1 to 13.3%)
- $9 \pm 2\%$ — Nitroglycerin
- $1 \pm 0.15\%$ — Diphenylamine
- $5 \pm 0.1\%$ — Potassium nitrate
- max. 0.3% — Sodium sulfate
- max. 0.7% — Calciumcarbonate
- $0.3 \pm 0.1\%$ — Graphite
- max. 0.5% — Ethyl acetate
- Powder wetness $0.5 \pm 0.25\%$ (distillation method)
- Content of foreign substances 1%
- Content of ether-soluble materials $15 \pm 2\%$ B.
- 50 – 70% — Sodium azide
- 10 – 25% — Potassium nitrate
- 20 – 30% — Aerosil
- 0 – 7% — Organic binding agents In order to be able to give the return spring a linear or diminishing characteristic line, the spring is constructed according to the invention in a conventional manner as a coil spring or as a double-coil bending moment spring.

A reel in which the inertia block consists of an electromagnetically operated pawl, a pendulum sensor and a switch, is characterized inventively by the pendulum sensor containing a standing pendulum and being arranged separate from the reel, wherein the pendulum is connected to a reed contact such that the pendulum movement is changed into translatory movement of the reed contact provided in a magnetic field. In this manner, the circuit between the electromagnetic pawl and battery is opened or closed as accelerations occur.

BRIEF DESCRIPTION OF THE DRAWINGS

The invention is illustrated in the figures.

FIG. 1 is a longitudinal cross-sectional view of a reel according to the invention, FIG. 2 is a cross-sectional view along the line II—II of FIG. 1, FIG. 3 is a cross-sectional view along the line III—III of FIG. 1, FIG. 4 is a cross-sectional view along the line IV—IV of FIG. 1, FIG. 5 is a cross-sectional view along the line V—V of FIG. 1, FIG. 6 is a schematic diagram of the interrelationship of an inertia block, which consists of an electromagnetically operated pawl, a pendulum sensor and a switch, and FIG. 7 is a cross sectional view taken along the line VII—VII of FIG. 1 and shows a double-coil bending moment spring.

DETAILED DESCRIPTION

The reel illustrated in FIGS. 1 to 5 consists of a cylindrical housing 1, which contains at one end a fuse carrier 2, in which are provided a primer pellet 3 and a fuel charge 4. The fuse carrier 2 is closed inwardly by a disk 5 which has holes 5a therein. Reference numeral 6 indicates a spindle which carries a piston-shaped head 7. The head 7 contains holes, by means of which it is arranged slidingly on guide pins 8, so that a rotation of the spindle 6 relative to the housing 1 is prevented. The head 7 is slidingly arranged in a cylinder 7a and has further a braking device which consists of a circular groove 9 having a conically tapered inner wall. A plurality of balls 10 are arranged in said groove such that upon movement of the piston 7 in a direction opposite to that of the arrow A the balls are pressed into engagement with the cylinder wall 7a. This causes a deformation of the cylinder material and a resulting braking action. Such a braking device has been described in German OS No. 2,349,891.

The spindle 6 engages with its external thread the internal thread of a nut 11, on which a winch 12 is arranged rotatably with an easy running fit. The winch 12 receives at one end a return spring 12b which is anchored in the cylinder wall 7a. The other end of the return spring 12b is wound around a pin 30 secured in an enlargement 1a in the housing 1 as illustrated in FIG. 1. Said return spring through its restoring force continuously winds up and lightly tensions the winch and a belt (not illustrated) secured thereto. This light tension does not hinder the person protected by the belt from movement with only a small acceleration.

The spindle 6 contains an axial hole 6a. Three pins 13 are arranged radially on the outer end of the nut 11, which pins are supported slidingly in holes 14 in the nut 11. Radial pockets 15 are provided in the winch 12, which pockets are arranged such that they can receive the pins 13 upon outward radial movement thereof. The pockets 15 are formed such that they can receive the pins at any position of the winch 12. A variation of the connection between winch 12 and nut 11 consists in the pin 13 being movable in an axial direction. From FIG. 4 it is apparent that the pin 13 lies in an opening which is formed by nuts 11a, 12a which lie opposite one another in the nut 11 and in the winch 12.

An inertia block 16 lies at the end of the winch 12, which inertia block consists of a ratchet ring 17 and a pawl 18, which is supported on an axis 19. The inertia block is locked or unlocked by means of an electromagnet 28, the coil of which is energized by an inertia member (not illustrated in FIG. 1). Parallel to the axis 19 of the pawl 18 there is arranged an axially movable pin 20, the one front surface 20a of which is connected to a gas channel 21. Through this gas channel 21 it is possible to guide the pyrotechnically produced gas to the pin 20, whereby it drives the pin out of its guideway and thereby releases the connection of the pawl 18 with the ratchet ring 17.

The device so described operates as follows:

If the vehicle is retarded for, for example 0.4 g., as occurs, for example, during braking, the inertia block 16, particularly the electromagnet 28 thereof, becomes energized to effect an engagement of the pawl 18 with the ratchet 17 to lock the winch 12 and the person being protected is held by the belt.

In the case of an impact, the electric primer pellet 3 is ignited by means of a delay-dependent sensor (not illustrated in FIG. 1) and the fuel charge 4 is fired. The gas which is thereby produced flows through the openings 5a into the cylinder chamber and moves the piston head 7 in the cylinder 7a slidingly and nonrotatively in direction A. Gas flows through the axial hole 6a and drives the pins 13 radially outwardly into the associated pockets 15. Since the piston head 7 is guided through the two guide bolts 8, it cannot rotate and moves axially in the direction of the arrow A. This acts through the thread on the spindle 6 to effect a rotary movement of the nut 11. Since same is connected to the winch 12 through the simultaneously shot-in pins 13, nut 11 and winch 12 rotate simultaneously. This terminates the period of clutch release and the entire belt slack is removed within a time period of approximately 15 ms. At the same time the gas drives the pin 20 out of its guide. This prevents a connection of the pawl 18 with the ratchet ring 17 so that the winch 12 can rotate freely for the braking thereof. Any pull on the belt will tend to rotate the nut 11 in the opposite direction and cause a movement of the piston head in a direction opposite to the arrow A but this movement is resisted by an engagement of the balls 10 with the wall 7a.

FIG. 6 illustrates a device for the inertia block, which consists of an electromagnetic pawl 18, a pendulum sensor 22 and a switch 23. The switch 23 is a magnetically operated switch consisting of a reed contact 24, which lies in the power field of a magnet 25 (permanent magnet or adjustable electromagnet). The pendulum 26 of the pendulum sensor is stationary with the centerpoint of its base plate 27 connected to the reed contact. During movement of the pendulum 26, for example into the position illustrated by dashed lines, the centerpoint of the base plate 27 lifts and with it the reed contact 24 also lifts for a small distance, which is sufficient to close the contact under the action of the magnetic field. In the illustrated example, the spool 28a receives voltage through this and effects a locking or unlocking of the pawl 18.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a reel for winding up safety belts in vehicles having a housing with a chamber therein, a threaded spindle axially slideably supported in said housing and having piston-shaped head means thereon slideably engaging the walls of said chamber in said housing, a threaded nut member rotatably supported in said housing and threadedly engaging said thread on said spindle, an axial movement of said spindle effecting a rotation of said nut member, a winch mounted for rotation in said housing and relative to said nut member, said belt being wound onto said winch, a return spring connected between said housing and said winch to resiliently urge said winch in a first direction to wind up said belt thereon, pyrotechnically produced gas generating means in said chamber and on one side of said piston-shaped head means for effecting, upon a firing thereof in response to an impact of said vehicle with another object, a driving of said spindle in a first axial direction to rotate said nut member and inertia block means for locking said winch against rotation in response to a braking of said vehicle at a rate in excess of a predefined normal braking rate, the improvement comprising at least one pin for connecting said nut member to said winch in response to the generation of gas caused by a firing of said pyrotechnically produced gas generating means, said pin being mounted in a hole in said nut member and said hole communicates with said chamber in which said pyrotechnically produced gas generating means is located through an axially extending hole in said spindle.

2. The improved reel according to claim 1, wherein said pin is movable in a radial direction and wherein a pocket is provided in said winch, said pocket receiving said pin therein so that said nut member becomes locked for simultaneous rotation with said winch.

3. The improved reel according to claim 1, wherein said pin is movable in an axial direction and wherein a groove is provided in said winch and in said nut, said grooves being aligned with one another and receiving said pin therein.

4. The improved reel according to claim 1, wherein said inertia block means comprises a ratchet ring and a pivotally supported pawl and a further pin arranged in a guideway extending parallel to the pivot axis of said pawl and being axially movable relative to said pawl, one end surface of said further pin being connected through a gas channel to said chamber and said one side of said piston head means, said further pin being drivable out of said guideway by the pyrotechnically produced gas to release the connection of said pawl with said ratchet ring.

5. The improved reel according to claim 4, wherein said pyrotechnically produced gas generating means comprises the following pyrotechnical compositions of which are used at least one of separate from one another, individually in powder, granulate and tablet form:

A.
84 ± 2% — Nitrocellulose (N-content 13.1 to 13.3%)
9 ± 2% — Nitroglycerin
1 ± 0.15% — Diphenylamine
5 ± 0.1% — Potassium nitrate
max. 0.3% — Sodium sulfate
max. 0.7% — Calcium carbonate
0.3 ± 0.1% — Graphite
max. 0.5% — Ethyl acetate Powder wetness 0.5 ± 0.25% (distillation method)
Content of foreign substances 1%
Content of ether-soluble materials 15 ± 2%

B.
50 – 70% — Sodium azide
10 – 25% — Potassium nitrate
20 – 30% — Aerosil
0 – 7% — Organic binding agents.

6. The improved reel according to claim 1, wherein said return spring is a coil spring.

7. The improved reel according to claim 1, wherein said return spring is a double-coil bending moment spring.

8. The improved reel according to claim 1, wherein said inertia block means comprises an electromagnet, an electromagnetically operated pawl, a pendulum sensor and a magnetically operated switch means including a reed contact, said pendulum sensor contains a pendulum member arranged to separate from said reel, wherein said pendulum member is connected to said magnetically operated switch means, a movement of said pendulum effecting a translatory movement of said reed contact into a magnetic field of said electromagnet to change the condition of said reed contact and activate said electromagnetically operated pawl.

9. The improved reel according to claim 8, wherein said magnetic field is a permanent magnetic field.

10. The improved reel according to claim 1, wherein said spindle has restraining means for restraining an axial movement of said spindle in said chamber following a firing of said gas generating means in response to an unwinding of said belt from said winch.

11. The improved reel according to claim 10, wherein said restraining means comprises an annular groove in said piston-shaped head, said groove having an inclined bottom wall out of parallel relation to the wall of said chamber and a plurality of balls in said groove, said balls permitting free movement of said spindle in said first axial direction and restraining said movement in the opposite direction.

* * * * *

UNITED STATES PATENT OFFICE
CERTIFICATE OF CORRECTION

Patent No. 4,056,242　　　　　　　　　Dated November 1, 1977

Inventor(s) Guenter Herrmann

It is certified that error appears in the above-identified patent and that said Letters Patent are hereby corrected as shown below:

Inventor first name "Gÿenter" should read -- Guenter --.

Column 6, line 19, delete "to".

Signed and Sealed this

Twenty-first Day of March 1978

[SEAL]

Attest:

RUTH C. MASON　　　　　　　LUTRELLE F. PARKER
Attesting Officer　　　　　Acting Commissioner of Patents and Trademarks